United States Patent
Boynton et al.

(10) Patent No.: US 8,710,398 B2
(45) Date of Patent: Apr. 29, 2014

(54) METHOD AND APPARATUS FOR LASER STRIP SPLICING

(75) Inventors: Scott Boynton, East Windsor, CT (US); Scott Poeppel, New Hartford, CT (US)

(73) Assignee: Joining Technologies, Inc., East Granby, CT (US)

( * ) Notice: Subject to any disclaimer, the term of this patent is extended or adjusted under 35 U.S.C. 154(b) by 364 days.

(21) Appl. No.: 13/109,124

(22) Filed: May 17, 2011

(65) Prior Publication Data

US 2011/0284511 A1    Nov. 24, 2011

Related U.S. Application Data

(60) Provisional application No. 61/346,061, filed on May 19, 2010.

(51) Int. Cl.
*B23K 26/00* (2006.01)
*B23K 37/00* (2006.01)

(52) U.S. Cl.
USPC ............. 219/121.63; 219/121.64; 228/5.7; 228/171; 228/231; 29/33 B (58) Field of Classification Search
USPC .......... 219/121.63, 121.64, 121.83; 228/171, 228/176, 212, 213, 5.7; 29/33 B, 33 Q; 148/525, 559
See application file for complete search history.

(56) References Cited

U.S. PATENT DOCUMENTS

| | | | | |
|---|---|---|---|---|
| 3,211,350 A * | 10/1965 | Brown | .......................... | 222/399 |
| 4,025,024 A * | 5/1977 | Sorsen | .............................. | 226/3 |
| 4,765,532 A * | 8/1988 | Uomoti et al. | ................ | 228/212 |
| 4,854,493 A | 8/1989 | Fujii et al. | | |
| 5,045,668 A * | 9/1991 | Neiheisel et al. | ......... | 219/121.83 |
| 5,190,204 A * | 3/1993 | Jack et al. | ....................... | 228/5.7 |
| 6,311,099 B1 * | 10/2001 | Jasper et al. | .................. | 700/166 |
| 6,521,865 B1 * | 2/2003 | Jones et al. | .............. | 219/121.72 |
| 7,107,118 B2 * | 9/2006 | Orozco et al. | ................ | 700/166 |
| 2005/0194363 A1 * | 9/2005 | Hu et al. | .................. | 219/121.64 |

FOREIGN PATENT DOCUMENTS

| | | | |
|---|---|---|---|
| EP | 0781621 A1 | | 7/1997 |
| EP | 1743728 A1 | | 1/2009 |
| JP | 08215872 A | * | 8/1996 |
| WO | 2010052339 A1 | | 5/2010 |

* cited by examiner

*Primary Examiner* — Samuel M Heinrich
(74) *Attorney, Agent, or Firm* — McCormick Paulding & Huber LLP (57) ABSTRACT

A splicing apparatus for joining a trailing end of a downstream metal strip to the leading end of an upstream metal strip includes a base having a working surface, a cover assembly operatively connected to the base and movable between an open position and a closed position, a fixed platen fixedly secured to the working surface, a moving platen slidably connected to the working surface, and a laser device for both cutting said downstream and upstream metal strips and for welding said metal strips together, the laser device including a laser source and a laser head in communication with the laser source, the laser head being connected to said cover assembly.

22 Claims, 5 Drawing Sheets

METHOD AND APPARATUS FOR LASER STRIP SPLICING

CROSS-REFERENCE TO RELATED APPLICATIONS

This application claims the benefit of U.S. Provisional Application Ser. No. 61/346,061, filed on May 19, 2010, which is herein incorporated by reference in its entirety.

FIELD OF THE INVENTION

The present invention relates generally to strip splicing and, in particular, to a method and apparatus for laser strip splicing.

BACKGROUND OF THE INVENTION

The art of metal conversion often includes welding steel and stainless steel strips, as well as other types of metal strips, end to end to generate longer spools of metal strips. In addition, it is frequently necessary to join two metal strips together at the intake of processing machinery so that the machinery can operate continuously and so that it is not necessary to rethread a strip through the machinery each time a new strip is processed. In the industry, the leading edge of a new strip is spliced to the trailing end of the last strip so that the strips do not have to always be rethreaded. In this context, it is known from practice to splice the metal strips to one another by welded joints.

Traditionally, the required welds are generated by mechanically sheering the trailing end of one strip and the leading end of the new strip, then welding the ends together using a gas tungsten arc welding ("GTAW") welding process and device. This process, however, is labor intensive, complex and dependent on the skill of the operator. An even more severe issue is that the GTAW is not able to weld material less than 0.008 inches thick and, even so, often requires multiple attempts before obtaining an acceptable weld. Laser based systems have been used in the past, and have been able to weld down to 0.004 inch thickness, but they are very time consuming and difficult to use due to the criticality of the edge conditioning and alignment of the strips.

In view of the above, there is a need for a laser strip splicing method and apparatus which are used to automatically create high quality welds between two metal strips, generally for the purpose of creating longer spools of strip without the need for complex manual alignment or weld parameter configuration.

SUMMARY OF THE INVENTION

With the foregoing concerns and needs in mind, it is a general object of the present invention to provide a method and apparatus for laser strip splicing.

It is another object of the present invention to provide a method and apparatus for laser strip splicing that generate high quality laser welds between strips to form a spliced web.

It is another object of the present invention to provide an apparatus for laser strip splicing that operates automatically after two strips are loaded into the apparatus.

It is another object of the present invention to provide an apparatus for laser strip splicing that is capable of welding steel, stainless steel and other metals between 0.002 and 0.050 inches thick.

It is another object of the present invention to provide an apparatus for laser strip splicing that is capable of welding strips between ⅛" and 14" wide.

It is another object of the present invention to provide an apparatus for laser strip splicing that is mobile to allow multiple slitting and winding systems to be serviced by a single apparatus.

It is another object of the present invention to provide an apparatus for laser strip splicing that has an intuitive graphical user interface that can be quickly learned by an operator without extensive technical training.

It is another object of the present invention to provide a method and apparatus for laser strip splicing that results in minimal protrusion of the weld on either side of the strip so as not to jam end user equipment or machinery.

It is another object of the present invention to provide a method and apparatus for laser strip splicing that results in minimal lateral misalignment between strip edges.

It is another object of the present invention to provide an apparatus for laser strip splicing that has the ability to anneal the newly created weld when needed to prevent brittleness.

A splicing apparatus for joining a trailing end of a downstream metal strip to the leading end of an upstream metal strip includes a base having a working surface, a cover assembly operatively connected to the base and movable between an open position and a closed position, a fixed platen fixedly secured to the working surface, a moving platen slidably connected to the working surface, and a laser device for both cutting said downstream and upstream metal strips and for welding said metal strips together, the laser device including a laser source and a laser head in communication with the laser source, the laser head being connected to said cover assembly.

In another embodiment, a method of splicing a trailing end of a downstream metal strip to the leading end of an upstream metal strip includes the steps of positioning the downstream strip and the upstream strip on a working surface of a splicing apparatus, cutting the trailing end of said downstream strip with a laser to create a downstream cut edge, cutting the leading end of said upstream strip with the laser to create an upstream cut edge, and welding the downstream strip to the upstream strip using the laser to create a spliced web.

DETAILED DESCRIPTION OF THE PREFERRED EMBODIMENTS

Referring generally to FIGS. 1-4, an apparatus 10 for laser strip splicing according to one embodiment of the present invention is shown. With specific reference to FIG. 1, the apparatus 10 includes a generally rectangular frame assembly 12 defining a base 14 and a generally rectangular cover assembly 16 hingedly connected to the base 14. As shown therein, the cover assembly 16 houses the main working components of the apparatus 10, including the cutting and welding mechanism, strip clamps, etc., as discussed below. Importantly, the cover assembly 16 includes a laser glass window 18 to allow safe viewing of the cutting and welding system. In the preferred embodiment, the laser glass window 18 is formed of a protective acrylic, although other materials known in the art may be used as a protective, yet transparent shield without departing from the broader aspects of the present invention.

Figure 1:
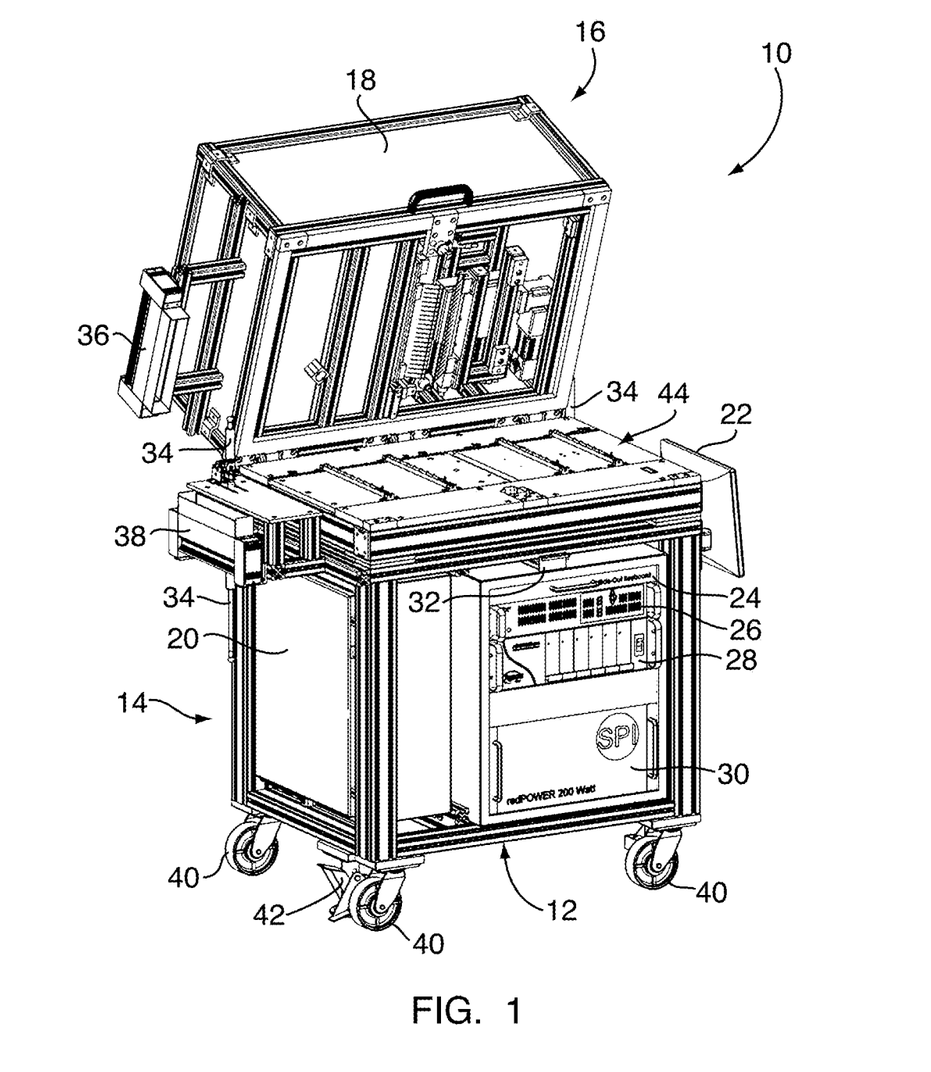
FIG. 1 is a perspective view of the apparatus for laser strip splicing, with the cover in an open position, in accordance with one embodiment of the present invention.

As shown in FIG. 1, the base 14 houses a controls cabinet 20, a monitor 22, a slide out keyboard 24, an industrial PC 26, an automation controller 28, a fiber laser 30 and a scrap tray 32. The monitor 22 is preferably a touch screen industrial personal computer (IPC) monitor functioning as a user interface, as discussed below, and is used for primary operation of the laser strip splicing apparatus 10, although other types of user interfaces, such as non-touch screen types, may also be used without departing from the broader aspects of the present invention. The monitor 22 serves as an interface from which an operator can control the entire operation of the apparatus 10, as discussed below. The monitor 22 can be folded against the side of the base 14 for transport and can be extended therefrom during use. The keyboard 24 is preferably an IPC keyboard, as known in the art, and is slidably mounted within the base 14 and movable between a first, stowed position and a second, extended position. In the second, extended position, the keyboard 24 is accessible to an operator such that data regarding welding, material, and alignment parameters, etc. can be entered into appropriate fields on the monitor 22 and stored and processed by the computer 26, as discussed hereinafter. In the preferred embodiment, the keyboard 22 is primarily utilized for data entry during setup and system diagnostics, as the apparatus is almost entirely automated subsequent to setup.

The industrial PC 26 is fixedly secured to the frame assembly 12 and primarily controls automation of the splicing process and the graphical user interface (GUI) on the monitor 22. The automation controller 28 is also fixedly secured to the frame assembly 12 and is preferably an industrial automatic controller that includes servo controllers, input/output (IO), etc. The automation controller 28 functions as an interface between the IPC 26 and the automation hardware. In addition, the fiber laser 30 is fixedly secured to the frame assembly 12 in close association with the industrial PC 26 and automation controller 28 within the base 14. In the preferred embodiment, the fiber laser 30 is an air-cooled 200-watt fiber laser that provides laser energy for cutting and welding. The laser energy is delivered from the fiber laser 30 housed in the base 14, to a laser head (and laser optics) housed in the cover assembly 16, through an armored fiber optic cable (not shown). The scrap tray 32 is provided to collect scrap strip left over from cutting the edges in preparation for welding/splicing, as well as cutting debris.

As further shown in FIG. 1, a controls cabinet 20 is secured to and housed by the base 14. The controls cabinet 20 houses electronic and pneumatic hardware, including IO distribution and level conversion, power distribution, power supplies, circuit breakers, etc. Nitrogen lift springs 34 are also secured to the frame assembly 12. The nitrogen lift springs 34 are preferably high-force nitrogen gas springs that support the majority of the weight of the cover assembly 14. As will be readily appreciated, with all of the components of the cover assembly 14, as discussed below, the cover assembly 14 can weight upwards of 170 lbs., Accordingly, the nitrogen lift springs 34 allow the cover assembly 14 to be safely and comfortably opened and closed by hand. In the preferred embodiment, there are two lift springs 34, although more or fewer lift springs may also be utilized without departing from the broader aspects of the present invention.

Importantly, the laser splicing apparatus 10 includes upper and lower annealing units 36, 38 that function to reheat and slowly cool the weld zone joining the strips subsequent to splicing, as required by certain materials. As shown in FIG. 1, the upper annealing unit 36 is fixedly secured to the cover assembly 14 adjacent a downstream end of the apparatus 10 (the left side of the apparatus 10 in FIG. 1) while the complimentary lower annealing unit 38 is secured to the base 16 just below the upper annealing unit 26 such that a web of spliced material (not shown) can pass therebetween. These annealing units 36, 38 are especially advantageous for materials that have brittle weld zones as a result of extremely rapid cooling. The annealing units 36, 38 preferably include high power infrared (IR) lamps with ellipsoidal reflectors that focus the heat generated by the lamps onto the weld from the top and bottom as the web of spliced material passes therebetween. In alternative embodiments, the annealing units 36,38 may be omitted from the apparatus.

The base 14 also includes a plurality of caster wheels 40 that facilitate movement of the entire apparatus 10 from machine to machine, as needed, during the course of operation. A parking brake 42 for locking the apparatus 10 in position during operation is also provided. As will be readily appreciated, the wheels 40 provide the apparatus 10 with mobility, allowing it to be conveniently moved from machine to machine, as needed.

Figure 2:
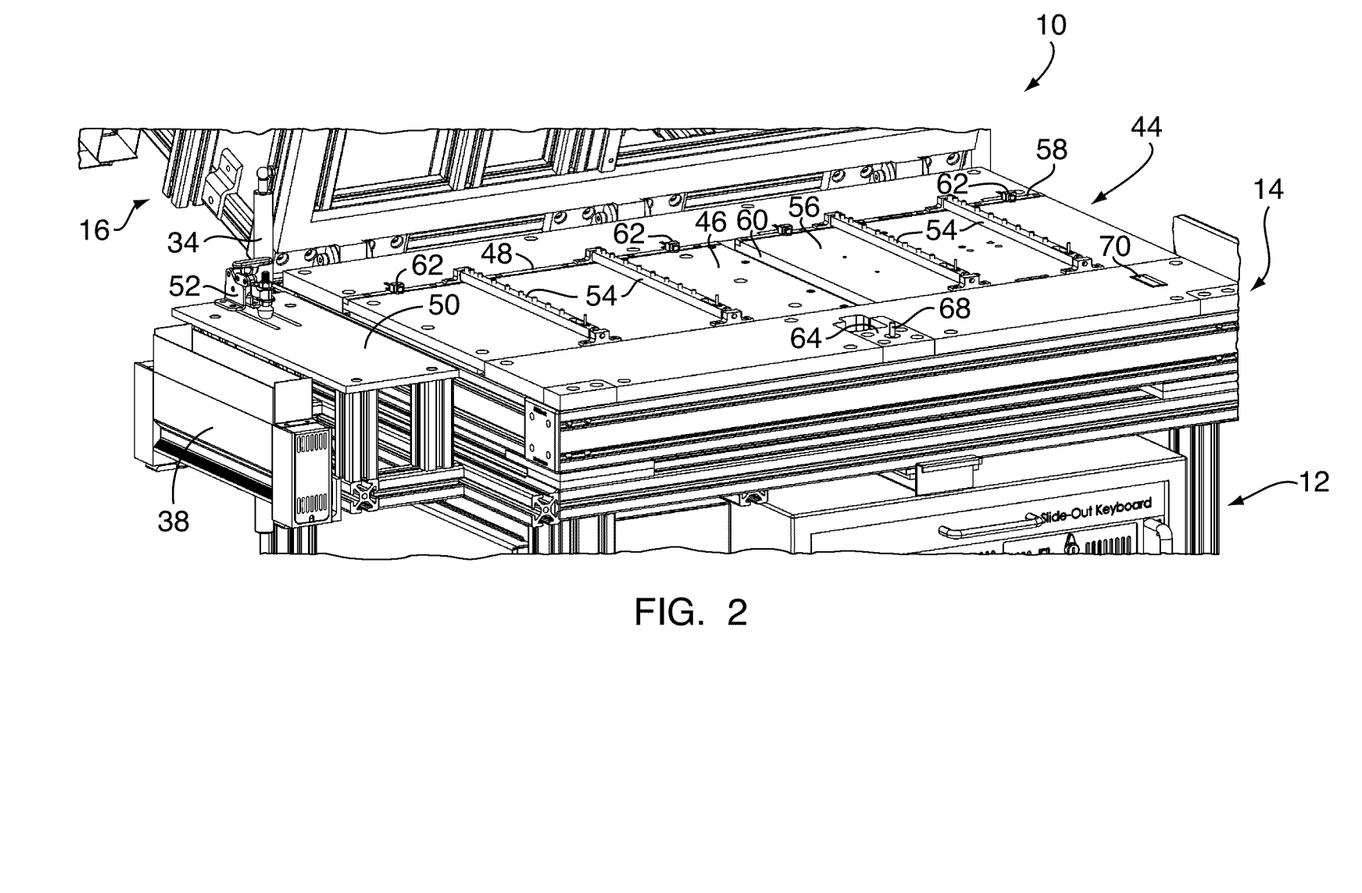
FIG. 2 is a detail perspective view of the working surface of the apparatus of FIG. 1.

Turning now to FIG. 2, a detail perspective view of the working surface 44 of the apparatus 10 is shown. As will be readily appreciated, the working surface comprises the upper portion of the base 14 and is accessible to an operator when the cover assembly 16 is in the open position. As shown therein, the working surface 44 includes a fixed platen 46, in the form of a heavy plate, that is permanently mounted to the base 14 of the apparatus 10. During operation, as discussed below, one of the strips to be welded, a downstream strip, is clamped to the fixed platen 46 such that the fixed platen 46 supports the strip from underneath. The strip is accurately located on the platen 46 by means of a fixed platen alignment fence 48 located on the back edge of the platen 46.

In connection with the annealing units 36, 38 discussed above, the apparatus 10 also includes an annealing platen 50 that supports and aligns the welded/spliced strip during the annealing operation, where required. An annealing clamp 52 is provided to lock the welded/spliced strip in position during the annealing operation.

As further shown in FIG. 2, clamps bars 54 are provided on the working surface 44 for fixing or holding the downstream strip of material to the platen 46. Preferably, there are 4 clamp bars 54, although more or fewer clamp bars may be utilized without departing from the broader aspects of the present invention. Each clamp bar 54 includes a tang at one end that engages a slotted receiver attached to the rear of the platen 46, a thumb latch at the other end that engages a hole in another receiver on the front of the platen 46, and a series of spring-loaded ball plungers in between which hold the strip down against the platen 46 during welding.

As also shown in FIG. 2, a moving platen 56 is mounted on the working surface 44 on precision linear slides such that it can move in the direction of the length of the strip (from left to right and right to left in FIG. 2). The moving platen 56 is located on generally the same plane of the fixed platen 46 and is positioned adjacent the fixed platen 46 proximate an upstream, in-feed end of the apparatus 10. During operation, one of the strips being welded, an upstream strip, is clamped to the moving platen 56, which supports the strip and accurately locates it by means of a moving platen alignment fence 58 on the back edge of the platen 56. As with the fixed platen 46, clamp bars 54 are utilized to hold the upstream strip of material to the moving platen 56. When the cover assembly 16 is closed, pins of the pusher bar, disclosed below, engage slots in the moving platen 56, allowing the pusher assembly to close the gap 60 between the platens 46,56 and thus the upstream and downstream strips subsequent to cutting.

In alternative embodiments, the moving platen 56 may be directly driven and the moving clamp bar 54 may be pushed by means of one or more engaging pins, as discussed below.

Importantly, the working surface 44 also includes a plurality of edge sensors 62 that are configured to detect gaps between the alignment fences 48, 58 and the strips being welded. The edge sensors 62 are preferably beam light sensors, although other sensors known in the art may also be utilized. As will be readily appreciated, detection of a gap indicates imprecise strip alignment (as the two fences 48, 58 are carefully aligned with one another), which, if uncorrected, can result in the welded joint having unacceptable camber and/or edge mismatch.

The working surface 44 of the base 14 further includes a number of features that ensure safe operation of the apparatus 10. In particular, as shown in FIG. 2, a locking plate 64 is provided and is adapted to receive a lid latching mechanism 66 in the cover assembly 16 to lock the cover assembly 16 in a closed position, the operation of which is discussed below. In an embodiment, high power electromagnets mounted on the cover assembly 16 may be utilized to more securely lock the cover assembly 16 to the base.

In addition, a damper 68, such as a fluid damper, is located on the working surface 44 and prevents the cover assembly 16 from slamming shut if it is dropped or closes too rapidly. As will be readily appreciated, this prevents damage to the motion/CNC system or optics of the apparatus 10. A cover sensor 70 is also provided in the working surface 44 of the base 14. Moreover, an additional sensor for verifying the correct engagement of the clamp before allowing motion or laser emission may also be included. Preferably, the cover sensor 70 is an encoded magnetic sensor that detects when the cover assembly 16 is closed. Importantly, laser firing and computer numerically controlled motion are inhibited when the sensor 70 does not detect that the cover assembly 16 is closed, thereby adding a level of safety to the apparatus 10.

Figure 3:
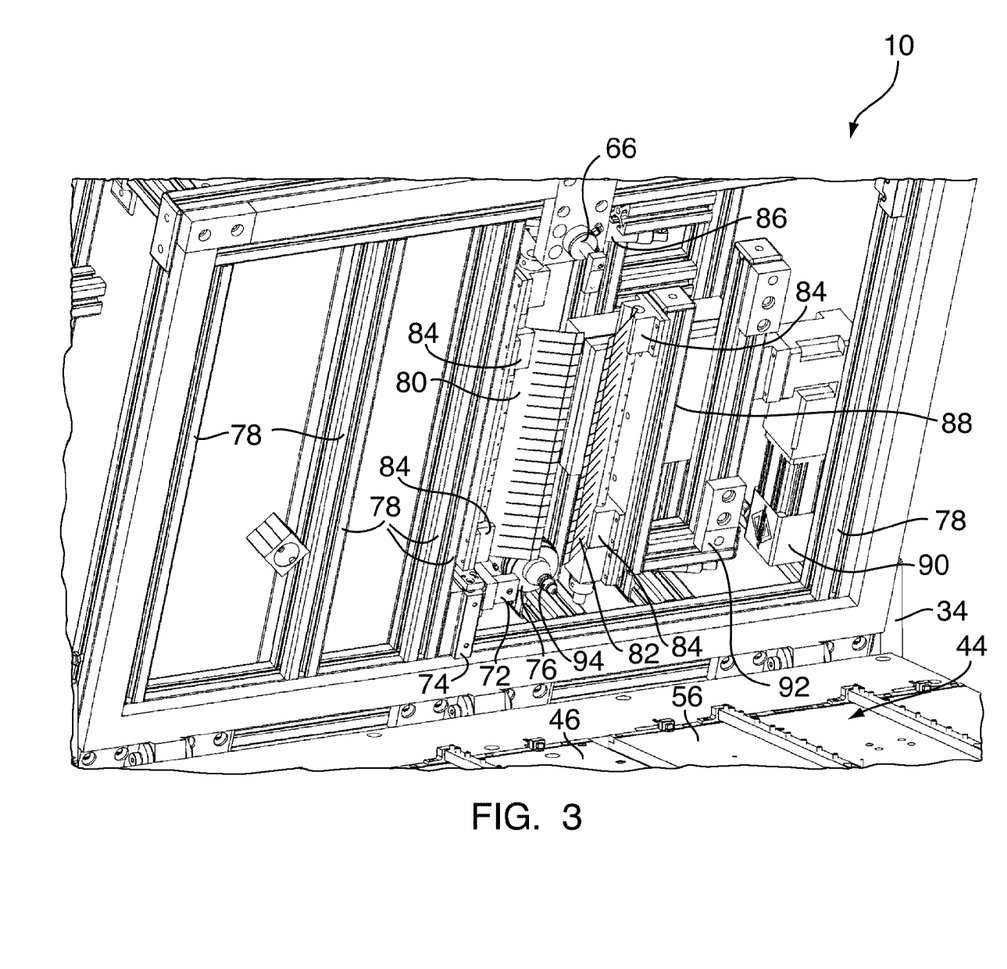
FIG. 3 is a detail perspective view of the underside of the cover assembly of the apparatus of FIG. 1, illustrating components thereof.

Referring to FIG. 3, a detail perspective view of the underside of the cover assembly 16 is shown. As shown therein, the cover assembly 16 includes a number of additional safety features to ensure that operators are not exposed to the laser beam during operation. In particular, the apparatus includes beam block 72 and a beam block actuator 74. The beam block 72 is preferably a copper block with a conical beam dump feature which serves to mechanically support a laser head 76 when docked, absorb laser energy during calibration and power changes, and physically intercept any light that is emitted by the laser 76 with the cover assembly 16 open, due to any failing of other safety measures, which could otherwise strike the operator. The beam block actuator 74 is preferably a pneumatic linear actuator which retracts the beam block 72 when not in use, preventing interference with the laser head 76 during cutting and welding.

Moreover, a light seal 78 is attached to the underside of the cover assembly 16 and extends along a periphery thereof. The light seal 78 is preferably a soft foam cushion that fills the gap between the cover assembly 16 and the base 14 and prevents an operator from being exposed to the laser by looking through the gap. The cover assembly 16 also includes a lid latch 66, as noted above. In the preferred embodiment, the lid latch 66 includes a twist-and-pull pneumatic cylinder with a pawl that engages the locking plate 64 on the base 14 to mechanically locking the cover assembly 16 closed, to the base 14, during the welding operation. As will be readily appreciated, engagement of the lid latch 66 with the locking plate 64 serves to compress the light seal 78 between the cover assembly 16 and the base 14, resists the force of leaf clamps, and prevents accidental opening during the operating cycle.

As alluded to above, the cover assembly 16 includes a fixed leaf clamp 80 which holds the downstream strip down as close as possible to the fixed platen 46, and a moving leaf clamp 82 which holds the upstream strip down as close as possible to the moving platen 56. In the preferred embodiment, the fixed leaf clamp 80 and moving leaf clamp 82 are sheets of spring steel. The fixed leaf clamp 80 is bent in the middle to allow mechanical clearance for both the clamp mechanism and the laser head 76. Slots on the working edge allow the clamp 80 to compensate for strips of different widths. A set of clamp bearings 84 (preferably 4 bearings 84) allow the shafts that support the strips to rotate by means of a clamp cylinders 86, allowing the clamps 80, 82 to be applied or removed by instruction from the computer 26, and the clamping force to be adjusted by a pressure regulator. The clamp cylinders 86 are preferably pneumatic cylinders which push or pull a lever arm connected to the support shaft of each of the two leaf clamps 80, 82, causing the shafts to rotate and forcing the leaf clamps 80, 82 down on the strips, preventing the strip edges form lifting off the fixed platen 46 and moving platen 56, respectively.

As further shown in FIG. 3, the cover assembly also includes a pusher stage 88, a pusher motor 90 and a moving platen pusher 92. The pusher stage 88 includes a ball screw which converts pusher motor 90 rotation into linear motion. The pusher motor 90 is preferably a rotary brushless servo motor, although other types of suitable motors known in the art may also be utilized without departing from the broader aspects of the present invention. The moving platen pusher 92 contains pins that engage the moving platen 56 when the cover assembly 16 is closed, allowing the pusher 92 to move it toward the fixed platen 46. During operation, the motor 90, pusher stage 88 and moving platen pusher 92 work in concert to close the gap between cut edges of the downstream strip (leading strip) and upstream strip (trailing strip) by moving/pushing the moving platen 56 towards the fixed platen 46.

As best shown in FIG. 3, the laser head 76 includes a nozzle and a laser aperture 94 in the laser cutting nozzle from which both the laser beam for welding and a cutting gas jet for cutting the strips are emitted.

Figure 4:
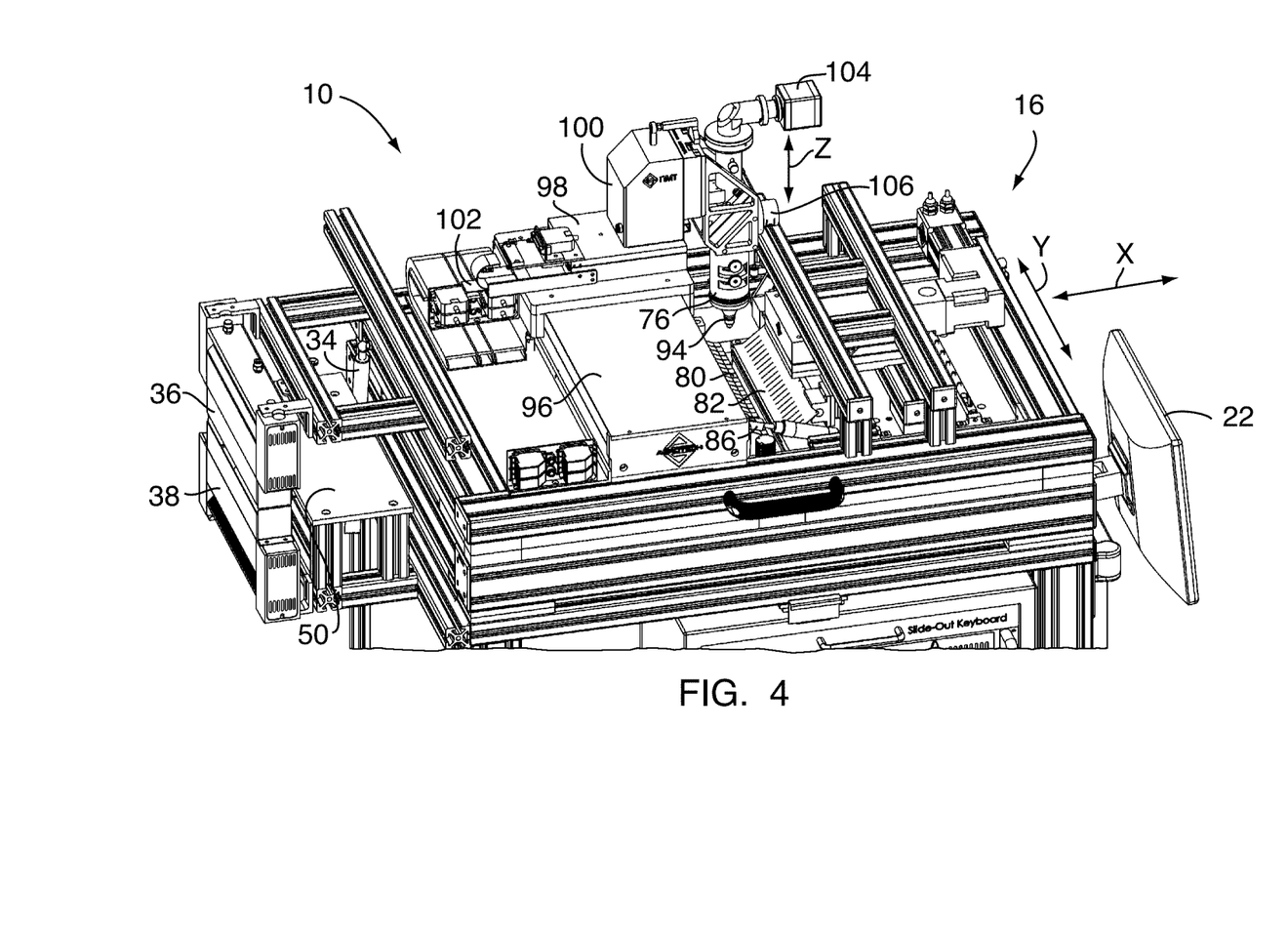
FIG. 4 is a detail perspective view of the top side of the cover assembly of the apparatus of FIG. 1, illustrating components thereof.

Turning now to FIG. 4, a detail perspective view of the top side of the cover assembly 16 of the apparatus 10, i.e., the interior of the cover assembly 16, is shown. As shown therein, the cover assembly 16 includes a CNC system having a linear X stage 96, a linear Y stage 98 and a linear Z stage 100. In the preferred embodiment, the linear X stage 96 comprises a high speed, high accuracy linear motor and components that move the laser head 76 in the X direction, perpendicular to the strips (indicated by arrow X). This X direction is the primary motion during a cutting or welding pass. Similar to the linear X stage 96, the linear Y stage 98 includes a high speed, high accuracy linear motor and associated gearing and components that move the laser head 76 in the Y direction, parallel to the strips (indicated by arrow Y). This motion creates the gap between the cut ends of the two strips by moving the head 76 between the cut of the strip on the fixed platen 46 and the cut of the strip on the moving platen 56. Likewise, the linear Z stage 100 includes a high speed, high accuracy linear motor that moves the laser head 76 in the Z direction, normal to the strip, i.e., vertically (indicated by arrow Z). The weight of the laser head 76 is offset by a pneumatic cylinder. The linear Z stage 100 is utilized to adjust laser focus, which is required when switching between cutting and welding, and to compensate any fixed angle error between the cover assembly 16 and platens 46,56. As shown in FIG. 4, a cable track 102 is provided in the cover assembly 16 which functions as a cable management system for controlling all the wires and hoses during motion of the CNC system (i.e., the linear X stage 96, linear Y stage 98 and linear Z stage 100).

While the CNC system of the preferred embodiment is configured to allow movement of the laser head 76 in directions parallel to, perpendicular to and normal to the strips, in alternative embodiments the CNC system may be configured to allow movement of the laser head 76 in three dimensions at any angle with respect to the strip. As will be readily appreciated, this added range of movement of the laser head 76 provides additional flexibility to the apparatus 10, such as allowing for cutting and welding at angles to the strip, i.e., for cuts and welds that are not perpendicular.

As further shown in FIG. 4, the cover assembly 16 includes a camera 104 to allow an operator to view the alignment, cutting and welding processes. The camera 104 facilitates beam and platen alignments and may also be used for automatic detection of the gap between the strips and the width of the strips. As alluded to above, the cover assembly 16 also houses the laser head 76. Importantly, the laser head 76 includes the optics necessary for both welding and cutting and in, particular, contains the objective lens, cutting gas nozzle, viewing optics to prepare the image for the camera 104 and coaxial illumination system, as well as mechanisms for aligning the laser spot and camera field of view. A laser fiber entry 106 port is provided on the laser head 76 and, in particular, on the laser optics, to which the output of the fiber laser 30 is mounted.

Figure 5:
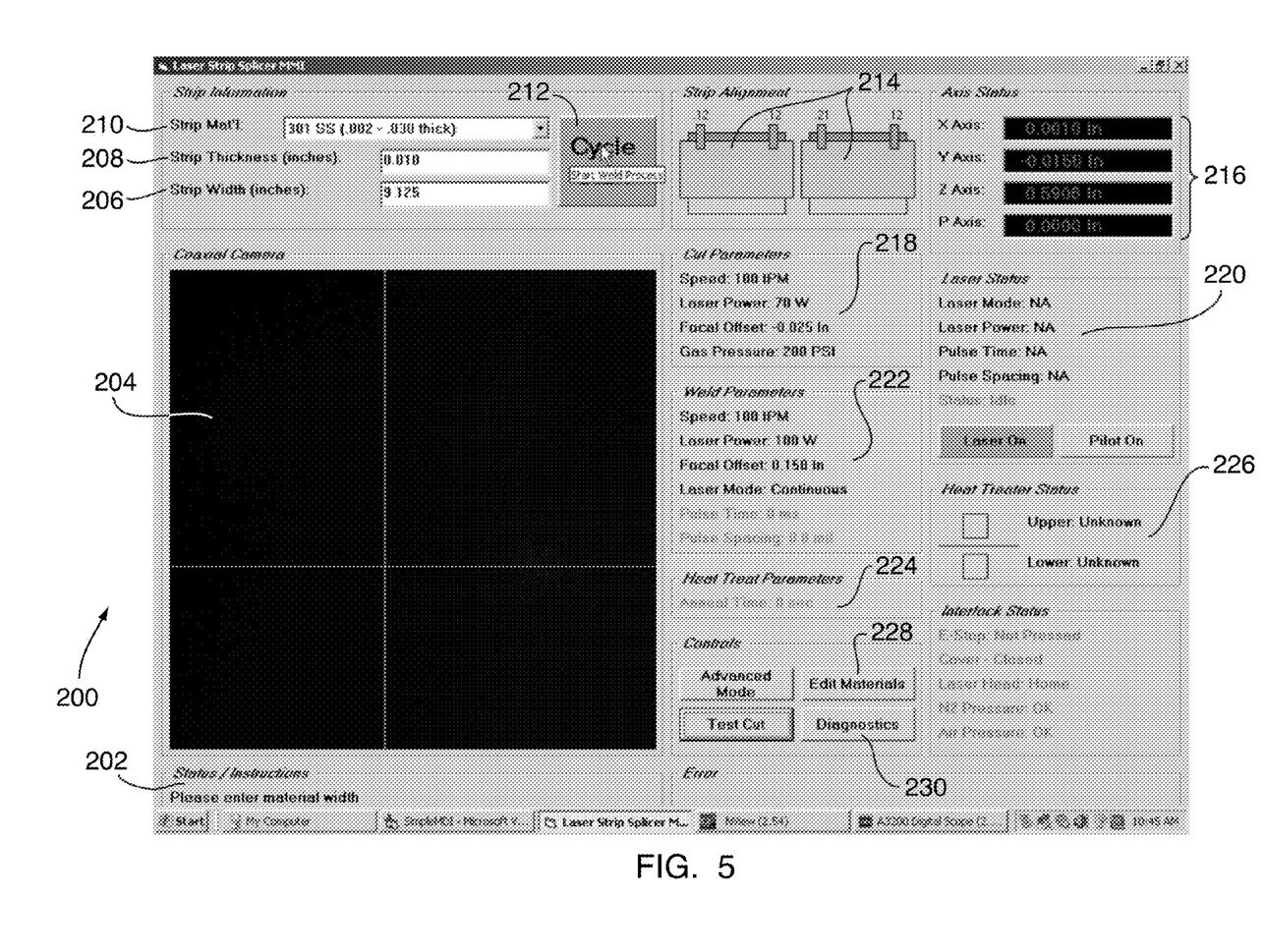
FIG. 5 illustrates a user interface for use with the apparatus of FIG. 1.

Another important aspect of the present invention is the software interface used to operate the apparatus 10 and to relay apparatus parameters to an operator. The user interface 200 is shown in FIG. 5. As shown therein, the user interface 200 includes a status display 202 which serves as the primary window for communicating system status and instructions to the operator. A coaxial camera display 204 displays images from the camera 104 and has a superimposed, repositionable crosshair. The crosshair may be adjusted by an operator through the on-screen interface 200 to align with the laser focal point. The interface 200 also includes a number of data fields in which an operator may enter material parameters. In particular, the data fields include a strip width data field 206 that includes a text box and pop-up keypad for use with the touch screen monitor by which an operator can enter the width of the strip, a strip thickness data field 208 that includes a text box and a pop-up keypad for use with the touch screen monitor by which an operator can enter the thickness of the strip, and a strip material data 210 field that includes a drop down combination box from which a user can select the strip material type.

As shown in FIG. 5, the user interface 200 also includes a cycle start button 212 which initiates the splicing cycle after setting the strip parameters. A strip alignment indicator field 214 also appears on the interface, and relays the strip alignment detected by the four gap sensors 62 to an operator. In particular, the alignment indicator field 214 displays "pass" or "fail" regarding the strip alignment at each of the four gap sensors 62. In the preferred embodiment, the color green may be used to indicate "pass," meaning that the strips are aligned properly, and red used to indicate "fail," meaning that the strips are improperly aligned. As shown therein, the interface 200 contains numerous displays for communicating apparatus parameters and status to an operator in real-time. An axis position display 216 shows the current position of the CNC axes 96, 98, 100 and axis specific errors (such as limits, over current, etc.). A cut parameter display 218 shows cut parameters for the selected material and thickness such as speed, laser power, focal offset and gas pressure, a laser status display 220 shows real-time laser parameters and status such as laser mode, laser power, pulse time and pulse spacing, and permits an operator to manually switch the laser on and off, and a weld parameter display 222 shows weld parameters for the selected material and thickness such as speed, laser power, focal offset and laser mode. Moreover, an annealing parameter display 224 shows weld parameters for the selected material and thickness, such as anneal time, and an annealer status display 226 shows the current, real-time status of each annealing unit 36, 38 (and associated lamps) with text and an icon.

In addition to the above, the interface 200 also features a material database editor button 228 which, when pressed or click by an operator, opens a parameter database containing, in particular, optimal weld parameters corresponding to material type, width and thickness. Moreover, the interface includes a diagnostics screen button 230, which opens diagnostic and maintenance window(s) that will guide an operator through diagnostics and maintenance, if and when required.

With reference to FIGS. 1-5, operation of the laser strip splicing apparatus 10 will now be discussed. After the apparatus 10 is powered (e.g., the apparatus can be plugged into a suitable wall outlet) and started (including homing the CNC system axes 96, 98, 100), the operator first selects the material type being welded from a list on the GUI 22, 200 in electrical communication with the control unit/computer 26. The operator is then prompted to enter the thickness of the strip. The software the references a pre-generated database of parameters, looking for the selected material and thickness. If an entry is found, the values in the database are used for the cutting, welding and annealing parameters, updating the parameter display fields 206, 208, 210. If the thickness is not found specifically, but is within the range covered by the database, the existing entries are interpolated to determine parameters and these are used to update the parameter display. Finally, if the requested thickness is outside the range covered by the table but within the range of the apparatus 10, the operator is prompted to have a technical expert develop parameters for the new thickness. Material thicknesses outside the designed range of the machine immediately generates an error. Lastly, the operator is prompted to enter the width of the strip, which is checked against the capacity of the apparatus 10. In the preferred embodiment, all data entry is done on the touch screen monitor 22, which allows numeric entry with a calculator style on screen keypad. In other embodiments, however, data may be entered through a stand-alone or remote computer in communication with the apparatus 10.

After the operator has entered material type, thickness and width in the appropriate data fields 206, 208, 210, the cycle start button 212 is enabled. When pressed, the operator is prompted to load the strips into the apparatus 10. This is done by first opening the cover assembly 16, assisted by gas springs 34, placing the strips on the platens 46, 56 and then pushing them against the alignment fences 48, 58 at the back of the platens 46, 56. The clamp bars 54 are then installed by first engaging the tang on one end of each claim bar 54 in a receiver mounted to the platens 46, 56. Each bar 54 is then pushed down, compressing a series of spring plungers against the strip, until the thumb latch on the other end of the clamps can engage another receiver on the near edge of the platens 46, 56, locking the clamps 54 in place. For very thin or narrow strips the four clamps 54 may not provide adequate clamping. In such cases, magnets may be used to provide additional clamping force. In other embodiments, magnets can be used as an alternative to the clamping bars 54.

During this process the status of each of the four edge sensors 62 is displayed continuously on the GUI 200 as green (acceptable) or red (too large). When all four sensors 62 are green, the upstream and downstream strips are acceptably well aligned to the fences 48, 58, and therefore the strips are aligned to each other. The sensors 63 work by shining a light emitting diode (LED) through the gaps between the strips and fences 48, 58, and measuring the light that makes it through the gap. The voltage produced by the sensor 62 is compared to a programmable set point to determine if the gap is acceptable at that sensor position.

Once the operator has loaded and clamped the strips, he or she closes the cover assembly 16. The closure of the cover assembly 16 is detected by the cover sensor 70, which sends a signal to the computer 26 and causes the process to continue automatically. The software first checks the four edge sensors 62. If any gaps are too large, the operator is warned and allowed to select whether to proceed anyway (in some cases the camber of the strip stock makes actuating both sensors on one platen impossible) or open the cover assembly 16 and correct the problem. In the preferred embodiment, from this point forward the process is fully automated. When the alignment is acceptable, the cover assembly 16 is latched closed by applying air pressure to the lid latch mechanism 66, which swings 90 degrees then pulls on the locking plate 64, locking the cover assembly 16 closed.

After the full closure of the cover assembly 16 is sensed, a pair of electromagnets (not shown) near the corners of the cover assembly are engaged, providing additional locking force to rigidly and securely connect the cover assembly 16 to the base 14. The fixed side leaf clamp 80 is then actuated, holding the downstream strip down at the edge of the fixed platen 46 and preventing fluttering. The pusher stage 88 including pusher 92 is then used to push the moving leaf clamp 82 (which is still open at this point), the moving platen 56 and moving side strip by 0.200" toward the fixed platen 46. This ensures that the moving platen 56 is correctly aligned to the moving leaf clamp 82. At this point, the moving side leaf clamp 82 is closed, holding the upstream strip in contact with the moving platen 56 and preventing fluttering. Alternate designs could use multiple leaf clamps per side to further reduce material deflection or distortion.

The next operation is to undock the laser head 76 from the beam block 72. To accomplish this, first, air pressure is applied to the counterbalance the cylinder in the Z axis 100, offsetting the weight of the head 76 (when docked the cylinder is depressurized to prevent the head from lifting out of the dock when the cover assembly 16 is opened). The Z axis (linear Z stage 100) is then enabled and lifts the head 76 out of its pocket in the beam block 72. Following this, the beam block 72 is retracted by the beam block actuator 74 to allow clearance for the motion of the laser head 76. Next, the laser head 76 is moved into position some distance (set by the parameter database) from the edge of the fixed platen 46, and sufficiently far from one edge of the strip to allow room for acceleration of the cutting mechanism in the laser head 76. The cutting gas and laser are turned on and the head 76 is moved at the required speed across the downstream strip, as determined by the database, cutting it cleanly to create a conditioned edge. The original edge falls into the removable scrap tray 32. The head 76 is then moved to the same distance from the edge of the moving platen 56 and the cut is repeated on the upstream strip to create a conditioned edge that matches the geometry of the conditioned edge of the downstream strip.

At this point, the operator is optionally prompted to confirm the success of the cuts (primarily to prevent crashes due to incomplete cuts during parameter development). Presuming the cuts are acceptable, the pusher stage 88, including pusher motor 90 and pusher 92, is used to close the gap between the platens 46, 56 by the distance between the newly created edges. This distance is calculated based on the known distance between the platens 46, 56, the distance between the cuts and the edges of the platens 46, 56, set by the parameter table, and the kerf of the cut, from the parameter table. The machine vision camera 104 or optical gap sensor could also be used to actively detect when the gap 60 if fully closed. As will be readily appreciated, incomplete closure makes welding impossible, while excess closure will cause the sheets to overlap, likely jamming the equipment when the strip is processed, so accurate closure is critical. In lieu of using the camera 104, a secondary position encoder on the moving platen 56 may also be used to ensure accurate closure distances.

As alluded to above, in an alternative embodiment, the moving platen 56 may be driven directly and the moving clamp bar 54 may be pushed by one or more engaging pins. In this embodiment, the apparatus 10 and process may be further refined by using a linear servo motor under the moving platen 56 to drive it directly, and driving the moving clamp 82 indirectly, rather than directly driving the moving clamp 82 and having the moving platen 56 follow mechanically. This may greatly improve accuracy and reliability by providing a much more consistent closure of the gap 60 between the platens 46, 56 and the strips. Alternative implementations may also use independent servo motors to position the moving side clamp 82 and the moving platen 56, allowing for ever greater reliability and flexibility.

The next step in the process is to splice the two strips together by welding. The welding process varies, however, depending on the material thickness. For material over 0.005" thick, the system first optionally makes a series of tack welds every 0.100" across the joint. This prevents separation during the final weld, if necessary. The laser head 76 of the apparatus then makes a penetration pass, either pulsing or continuous wave CW according to the parameter table.

As will be readily appreciated, thin materials are more complicated, as they will not fuse correctly unless the fit up is perfect. With thin materials, i.e., approximately 0.005" thick or less, the first step is to place the welding nozzle and laser aperture 94 over the center of the joint, and apply current to force the Z axis (linear Z stage 100) down. This acts as a clamp and ensures that the strips are perfectly aligned vertically. The laser 30 then fires a pulse. This is repeated at both edges of the sheet, then 25% and 75% across the joint, then 12.5%, 37.5%, etc., and finally 6.25%, 18.75% etc. This complex profile ensures that the joint is pulled together by the tacks, rather than pulled apart, and creates a very tight joint. Next, the head 76 is lifted to a sharper focus and a more closely spaced series of tack welds is optionally created to reinforce the original 15 tacks, if needed. Finally the penetration pass is made with very close, overlapping tacks.

During either welding operation, i.e., on thick or thin material, nitrogen shield gas flows slowly through the laser orifice 94 to prevent lens contamination, from gas lenses on each side of the cutting gas nozzle to provide shielding for the top of the weld, and from a long diffuser mounted under the fixed side platen 46, which fills the gap between the platens 46, 56 and prevents the root from oxidizing. When the moving platen 56 is moved to close the gap 60 between the cut edges, a cam mechanism extends a gas dam across the bottom of the gap, preventing the nitrogen from flowing out the bottom. By retracting the dam for the cut and extending it for the weld, the gas can be contained when needed without covering the dam with cutting slag, which would eventually jam the system. Instead the cutting slag is blown directly into the scrap tray 32. In alternative embodiments, it may be desirable to use argon rather than nitrogen gas.

After the weld is complete the laser head 76 is re-docked, the cover latch 66 is released and the operator is prompted to open the cover assembly 16. If the material does not require annealing, the process is complete and the operator is prompted to remove the workpiece/web, i.e., the spliced strips. If annealing is required, the operator is prompted to move the weld joint to the annealing position and close the annealing clamp 52, which locks the workpiece/web to the annealing platen 50. The operator then closes the cover assembly 16 once again, which is detected by the cover sensor 70. The annealing units 36, 38 are turned on for a predetermined duration, as set by the parameter database, then turned off. The operator is then prompted to open the cover assembly 16 and remove the finished splice. The apparatus 10 is then ready to weld again.

Alternatively, the apparatus 10 may be constructed with a planishing system in place of the annealing units 36, 38. Planishing uses hard steel rollers under tremendous force to flatten any protrusion of the weld bead, generating a consistent and uniform final surface. This embodiment is targeted toward materials that do not require annealing for end uses, but that do require very consistent geometry across the weld.

In addition to the normal operator mode, the system 10 also has a setup mode and a diagnostic mode. In setup mode, intended for technicians trained in cut and weld development, two additional buttons are available. One opens a screen which allows the database of cutting, welding and annealing parameters to be edited, as well as allows materials and material thicknesses to be added or removed from the database. The other is a "Test Cut" button. The "Test Cut" button prompts the apparatus to make a full-width cut (in dependence upon the values from the width, thickness and parameter database) near the fixed plated 46. This can be used when material condition requires precutting the end of the strip before the main welding sequence to remove irregularities that extend past the last 0.25" of the part.

The final mode is diagnostic, and intended for system maintenance and debugging. When is this mode a final button becomes available, which brings up a diagnostic window when clicked. In this mode, all inputs can be read, all outputs can be directly set or read and the threshold values for the edge alignment sensors 62 an be set. In addition it is possible to set laser power, turn on or pulse the beam, and read and write the laser's setup and diagnostic information. Finally, the diagnostic screen offers buttons for basic testing and debugging, such as opening or closing the cover assembly 16, docking or undocking the laser head 76 and calibrating the laser head 76 and laser 30.

In view of the above, the apparatus 10 and method of the present invention provides a number of distinct advantages over prior art strip splicing apparatuses and methods. Importantly, the apparatus 10 of the present invention is mobile, requiring only an electrical connection and optional air and nitrogen connections. In an embodiment, both pneumatics and cutting/shielding gas can be provided by a small onboard nitrogen bottle.

As will be readily appreciated, the spliced web is not captured by the mechanism after welding, allowing it to be removed from the apparatus 10 so that the apparatus can be used on multiple webs or multiple stations. This is accomplished by mounting all of the laser optics (contained in the laser head 76) and motion system (moving platen 56 and pusher stage 88, as well as linear X, Y and Z stage 96, 98, 100) in a copy machine style lifting cover assembly 16, as described above, allowing for full access to the work surface 44 during setup.

As discussed above, the apparatus utilizes a fiber laser 30 for both cutting the strip edges and welding them together. By utilizing the same laser, and thus the same motion system, for both of these operations, the apparatus becomes much less sensitive to inaccuracies in the motion system, as any persistent motion errors will be present in both cut profiles and the weld profile. Therefore, even if the cuts are not straight and square, they will vary identically, and thus will still fit together perfectly. In addition, the weld will also follow this same path, and thus will also vary identically with the cuts. As will be readily appreciated, this is a tremendous improvement over known systems that independently cut the strip ends and weld them together, which requires very accurate and absolute alignment between the cutting and welding mechanisms. With known systems, any misalignment between the separate cutting and welding mechanisms will result in inferior welds.

By utilizing the apparatus 10 and method of the present invention, reliable splicing, of very thin strips in extremely wide widths is possible. In particular, the apparatus and method of the present invention are capable of creating welds with width/thickness ratios in excess of 7000).

As discussed above, the apparatus 10 and method of the present invention are designed for welding, in particular, non-magnetic materials such as some stainless steels. Notably, in additional to optional magnets, a combination of manually placed bar clamps and pneumatically actuated spring steel leaf clamps are utilized to locate and retain the strips in place. In contrast to the present invention, many known apparatuses and methods only utilize magnetic chucks to hold the strips in place, which would not be suitable for most stainless steels.

In addition to the above, the coaxial machine vision camera 104 incorporated into the laser optics (i.e., laser head 76) allows for automatic detection of joint alignment, strip width and gap closure, as described above. Importantly, the apparatus 10 and method of the present invention are capable of splicing strips having an exceptional range of thicknesses and widths, on demand, without mechanical reconfiguration. Width may be varied by a factor of more than 100, and thickness may be varied by a factor of more than 20 just by entering the desired values on the touch screen user interface.

Compared to known systems, the apparatus of the present invention is extremely fast and intuitive due to the combination of a single cutting and welding mechanism and the high degree of automation and user interface development, which includes a pre-developed and expandable material and weld parameter database. As will be readily appreciated, the inclusion of onboard annealing units 36, 38 (annealing system) eliminates the need for an additional step and system. Moreover, incorporating the annealing information into the main parameter database reduces the chances of incorrect setup.

The use of a fiber laser 30 makes the apparatus 10 extremely compact and mobile, allowing it to be moved between workstations, in contrast to known devices which are much more complex and bulky due to the use of other laser sources, such as carbon dioxide lasers, and the like. Most importantly, unlike known devices, the apparatus of the present invention, as discussed above, is essentially automatic and can process an array of materials having a wide range of widths and thicknesses without any input by the operator other than entering the specifications of the strip to be welded/spliced. As will be readily appreciated, this characteristic further qualifies the apparatus 10 for use in converting facilities on multiple lines, where having to reconfigure the apparatus between every weld would be devastating to productivity.

In addition, the apparatus 10 allows lower material thicknesses to be welded than are possible on known devices. In an embodiment, strips having thicknesses of approximately 0.002 inches to 0.050 inches and widths of approximately 0.125 inches to 14 inches may be spliced utilizing the apparatus 10 of the present invention. In alternative embodiments, the apparatus 10 may be modified to allow for the splicing of strips in excess of 0.050 inches thick and having widths greater than 14 inches.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A strip splicing apparatus for joining a trailing end of a downstream metal strip to the leading end of an upstream metal strip, comprising:
   a base having a working surface;
   a cover assembly pivotally connected to said base and movable between an open position and a closed position;
   a fixed platen fixedly secured to said working surface;
   a moving platen slidably connected to said working surface; and
   a laser device for both cutting said downstream and upstream metal strips and for welding said metal strips together, said laser device including a laser source and a laser head in communication with said laser source, said laser head being housed in and connected to said cover assembly.

2. The strip splicing apparatus of claim 1, wherein:
   said laser device is an air-cooled 200-watt fiber laser.

3. The strip splicing apparatus of claim 1, further comprising:
   at least one annealing unit connected to one of said base and said cover assembly and positioned downstream of said working surface.

4. The strip spicing apparatus of claim 1, further comprising:
   a fixed platen alignment fence positioned along an edge of said fixed platen;
   a moving platen alignment fence positioned along an edge of said moving platen; and
   a plurality of edge sensors, said edge sensors configured to detect gaps between said fixed platen alignment fence and said downstream metal strip and said moving platen alignment fence and said upstream metal strip.

5. The strip splicing apparatus of claim 1, further comprising:
   a fixed leaf clamp connected to said cover assembly for clamping said downstream metal strip to said fixed platen; and
   a moving leaf clamp connected to said cover assembly for clamping said upstream metal strip to said moving platen.

6. The strip splicing apparatus of claim 1, further comprising:
   a means for selectively moving said moving platen towards and away from said fixed platen to selectively open or close a gap therebetween.

7. The strip splicing apparatus of claim 1, further comprising:
   a CNC system for automatically controlling movement of said laser head in three dimensions.

8. The strip splicing apparatus of claim 1, further comprising:
   a camera housed in said cover assembly, said camera assembly detecting at least one of an alignment between said upstream strip and said downstream strip, a strip width and a gap closure.

9. The splicing apparatus of claim 1, further comprising:
   a graphical user interface, said graphical user interface including a plurality of data fields for accepting input data relating to strip parameters, a strip alignment field, and at least one of a cut parameter field, a weld parameter field and a heat treatment parameter field.

10. The splicing apparatus of claim 1, wherein:
    said apparatus is capable of welding strips having a width/thickness ratio in excess of 7,000.

11. The splicing apparatus of claim 1, wherein:
    said apparatus is capable of welding strips having a thickness between approximately 0.002 and 0.050 inches.

12. The strip splicing apparatus of claim 6, wherein:
    said means for selectively moving said moving platen is housed in said cover assembly.

13. A method of splicing a trailing end of a downstream metal strip to the leading end of an upstream metal strip utilizing a splicing apparatus having a base having a working surface including a fixed platen and a moving platen and a cover assembly pivotally connected to said base, the method comprising the steps of:
    positioning said downstream strip on said fixed platen;
    positioning said upstream strip on said moving platen;
    cutting said trailing end of said downstream strip with a laser having a laser head housed in said cover assembly to create a downstream cut edge;
    cutting said leading end of said upstream strip with said laser to create an upstream cut edge;
    aligning said upstream cut edge with said downstream cut edge; and
    welding said downstream strip to said upstream strip using said laser to create a spliced web.

14. The method of splicing metal strips according to claim 13, further comprising the step of:
    adjusting a focus of said laser subsequent to said cutting steps and prior to said welding step.

15. The method of splicing metal strips according to claim 13, wherein:
    said laser is a fiber laser.

16. The method of splicing metal strips according to claim 13, further comprising the step of:
    annealing a weld zone of said spliced web in dependence upon a material type of said strips.

17. The method of splicing metal strips according to claim 13, further comprising the step of:
    entering material parameters of one of said metal strips into a control unit, said material parameters including at least one of material type, material thickness and material width.

18. The method of splicing metal strips according to claim 17, further comprising the steps of:
- retrieving cut and weld specifications from a database in dependence upon said entered parameters; and
- automatically executing said cutting and welding steps in dependence upon said specifications.

19. The method of splicing metal strips according to claim 13, further comprising the step of:
- removing said spliced web from said splicing apparatus.

20. The method of laser strip splicing according to claim 19, further comprising the step of:
- automatically measuring an alignment of said downstream metal strip in relation to said upstream metal strip.

21. A method of laser strip splicing, said method comprising the steps of:
- cutting an upstream end of a downstream metal strip and a downstream end of an upstream metal strip utilizing a splicing apparatus having a base and a cover assembly pivotally connected to said base and movable between an open position and a closed position; and
- welding said downstream metal strip to said upstream metal strip to create a web;
- wherein said step of cutting and said step of welding are carried out by a single fiber laser having a laser head housed in said cover assembly.

22. The method of laser strip splicing according to claim 21, further comprising the steps of:
- removing said web from said splicing apparatus; and
- wheeling said apparatus to another location.

* * * * *